United States Patent [19]

Hayhurst et al.

[11] Patent Number: 4,512,681
[45] Date of Patent: Apr. 23, 1985

[54] TAPER BUSH

[75] Inventors: Gordon A. Hayhurst, Hessle; David A. Rayner, Burton Pidsea, both of England

[73] Assignee: J.H. Fenner & Co. Limited, England

[21] Appl. No.: 288,754

[22] Filed: Jul. 31, 1981

[30] Foreign Application Priority Data

Aug. 5, 1980 [GB] United Kingdom ................ 8025499

[51] Int. Cl.³ ............................................. F16B 2/00
[52] U.S. Cl. .................................. 403/371; 403/371; 403/358; 74/573 R; 73/66
[58] Field of Search ............... 403/370, 371, 372, 356, 403/358, 374; 74/573 R; 73/66; 416/144

[56] References Cited

U.S. PATENT DOCUMENTS

| | | | |
|---|---|---|---|
| 1,970,435 | 8/1934 | Sharp | 416/144 |
| 2,140,017 | 12/1938 | Koch | 416/144 |
| 2,509,711 | 5/1950 | Williams | 403/16 |
| 2,519,958 | 8/1950 | Firth | 403/16 |
| 2,676,849 | 4/1954 | Houck et al. | 403/370 X |
| 2,714,520 | 8/1955 | Krause | 403/370 X |
| 3,074,293 | 1/1963 | Langsetmo | 416/144 X |
| 3,085,631 | 4/1963 | Dagrell | 416/144 |
| 3,097,824 | 7/1963 | Bunger et al. | 416/144 |
| 3,368,833 | 2/1968 | Chung | 403/356 |
| 3,531,216 | 9/1970 | Callahan | 403/370 X |
| 3,541,882 | 11/1970 | Testa | 403/370 X |
| 3,893,779 | 7/1975 | Schroeter | 403/370 |
| 4,140,413 | 2/1979 | Conrad | 403/370 |

FOREIGN PATENT DOCUMENTS 3011145  10/1981  German Democratic Rep. ...................... 403/373

Primary Examiner—Richard J. Scanlan, Jr.
Attorney, Agent, or Firm—William E. Mouzavires

[57] ABSTRACT

The present specification discloses a tapered, longitudinally-split contractible taper bush for securing pulleys, sprockets, coupling flanges or other machine elements onto cylindrical shafts and utilizing a plurality of screws or bolts parallel with the hub axis for effecting wedging of the bush between the hub of the element and the shaft onto which it is mounted. Known bushes of this type suffer an out of balance moment due to the arrangemnt of locking holes, part threaded holes provided for de-wedging and bush removal, and the size of the longitudinally extending slit which is necessary to promote flexibility in the bush for bush removal.

The present invention overcomes the out of balance problem by providing profiling in the region of the longitudinal slit so that the disposition of metal is then such as to compensate for the mass imbalance in both the bush and a co-operating mating hub, a rotationally balanced system being thus provided.

14 Claims, 5 Drawing Figures

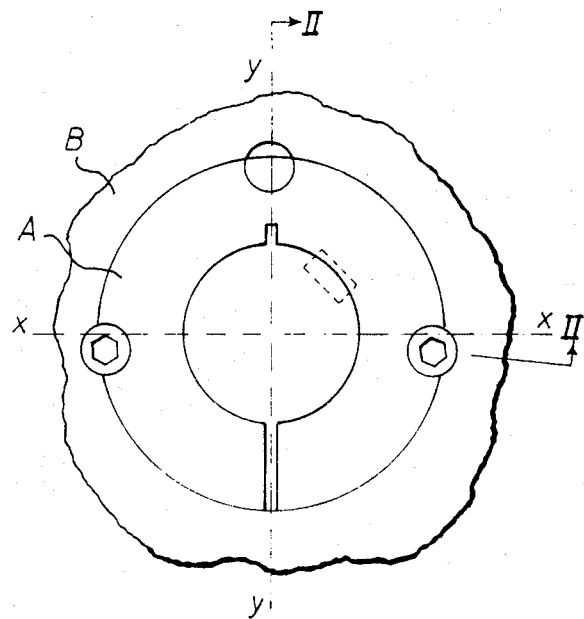
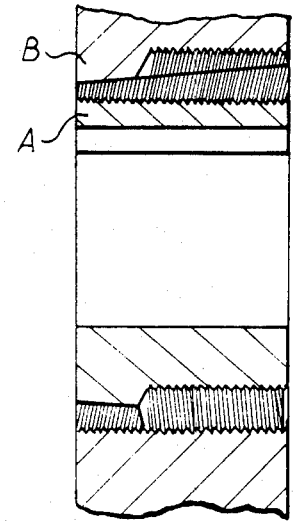
Fig 1.  Fig 2.
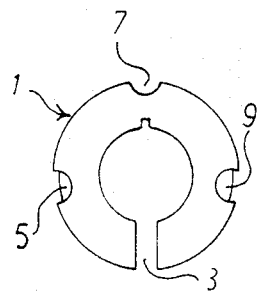
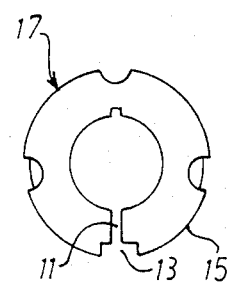
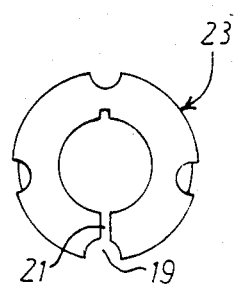
Fig 3.  Fig 4.  Fig 5.

TAPER BUSH

DESCRIPTION

This invention relates to taper bushes designed for hub and bush assemblies for securing pulleys, sprockets, coupling flanges or other machine elements to cylindrical shafts.

More specifically the invention is applicable to tapered, longitudinally-split, contractible bushes of the type disclosed in British Patent Specification No. 592,912.

In certain types of known taper bush system which utilise a plurality of screws or bolts parallel with the hub axis to produce a wedging effect of the bush between the hub of a pulley or other element and a shaft, the symmetrical configuration of the bush is distorted by the disposition of metal removal designed to facilitate securement of the bush and element onto the shaft and also to provide for subsequent and ready removal of these elements from the shaft. The hub into which the bush fits is often similarly asymmetrical, being provided with three holes located to match those in the bush. This lack of symmetry in the system inevitably affects the balance of the bush and hub assembly which can lead to excessive vibration during rotation. This is especially disadvantageous when the assembly is located in vibration-sensitive situations particularly on relatively flexible structures.

In operation of course, locking holes are normally partially filled by locking screws, or bolts, the mass of which can be taken into account. A keyway is sometimes employed which is machined in the parallel bore of the bush to mate with a similar keyway in the shaft. In this case, where a key of similar material and axial length to the bush is employed, the effect on the balance of the system can be minimised by arranging for the respective keyways in the shaft and bush to be diametrically opposed.

With known types of bushes, the resultant assembly may still suffer an out of balance moment due to part of the locking holes, the part-threaded hole provided for de-wedging and bush removal, and the size of slit which is necessary to promote compliance of relatively massive bushes.

One object of the present invention is to provide a bush which overcomes or at least mitigates these difficulties and disadvantages resulting from the out of balance moment present in the complete assembly comprising bush and mating hub.

According to the present invention, a tapered, longitudinally-split contractible taper bush for securing pulleys, sprockets, coupling flanges or other machine elements onto cylindrical shafts and utilising a plurality of screws or bolts parallel with the hub axis for effecting wedging of the bush between the hub of the element and the shaft onto which it is mounted, is profiled in the region of its longitudinal slit so that the disposition of metal is such as to compensate for the mass imbalance in both the bush and a cooperating mating hub and thus provide a rotationally balanced system.

The profiling is dimensioned and contoured so that it may be cheaply and conveniently carried out on high volume multi-operation machinery, although bushes according to the invention may equally well be produced by sintering, casting, or other forming processes.

Preferably, the profiling comprises a widened longitudinal slit or it may be a shallow or local enlargement symmetrically positioned about the longitudinal slit.

In a particularly preferred embodiment, the shaping comprises a hole drilled partially and longitudinally in the region of the slit.

Generally, material removal to effect balance is by machining of an aperture of constant section in the axial plane. Consideration of the dynamic balance of the system requires removal of material over the full length of the bush for optimum effect.

The invention will now be described, by way of example, with reference to the accompanying drawings, in which:

FIG. 1 shows a conventional bushing of the prior art type described in elevation;

FIG. 2 is an angled section taken along the line II—II of FIG. 1; and

FIGS. 3, 4 and 5 show schematic end elevations of the three different embodiments of the present invention.

Considering the bushing of FIGS. 1 and 2, and looking axially on the end elevation, it is apparent that the sum of the volumes of metal removed from the otherwise solid assembly i.e. bush A and hub B, is symmetrical about the plane y—y, but is asymmetrical about the plane x—x, thus creating a mass imbalance in operation.

FIG. 3 shows a bush 1 according to one embodiment of the invention whereby additional material has been removed from the bush 1 to form a widened longitudinal slit 3 and hence to create a state of balance when account is taken of all other metal removals 5,7,9, including those from the surrounding taper bored hub (not shown).

FIG. 4 shows another embodiment of the invention where the longitudinal slit 11 is widened locally as at 13 towards the outer surface 15 of the bush 17 sufficiently to create a state of balance again when account is taken of all metal removals.

FIG. 5 shows yet another embodiment of the invention in which the local widening 19 of the longitudinal slit 21 is achieved by drilling a hole partially within the bush 23.

Other embodiments are possible by suitably profiling the bush, conveniently in the region of the longitudinal slit which tends to become closed on cooperation of the bush with a surrounding mating hub.

We claim:

1. In a tapered, longitudinally-split contractable taper bush for securing pulleys, sprockets, coupling flanges or other machine elements onto cylindrical shafts and wherein the bush has a central axis and three holes extending axially of the bush at angularly spaced locations about said axis for receiving screws or bolts parallel to said axis for wedging the bush between the element to be secured and a shaft positioned axially within the bush and wherein the bush has a longitudinal slit extending throughout the axial length of the bush at a location between two of the holes opposite the third hole in the bush, the improvement comprising an enlargement of the longitidunal slit wherein the enlargement is of predetermined size and distance from said axis to impart substantial rotational balance to the bush and the element and shaft to be associated therewith during use thereof.

2. The bush defined in claim 1 wherein said bush includes opposite surfaces defining said slit and an axis of symmetry extending between said surfaces, and wherein said enlargement is symmetrically positioned on opposite sides of said axis of symmetry of the slit.

3. The bush defined in claim 2 wherein said enlargement includes a recess opening into said slit.

4. The bush defined in claim 3 wherein said recess extends throughout the length of the bushing.

5. The bush defined in claim 4 wherein said recess has a constant cross-section axially of the bush throughout the length of the bush.

6. The bush defined in claim 5 further including an outer surface and wherein said recess opens into said outer surface of the bush on opposite sides of said slit.

7. The bush defined in claim 6 having flat surfaces defining said recess.

8. The bush defined in claim 6 having arcuate surfaces defining said recess.

9. The bush defined in claim 1 wherein said bush has an outer surface and recessed surfaces extending between said outer surface and slit to define said enlargement.

10. The bush defined in claim 9 wherein said recessed surfaces extend axially of the bush throughout the length thereof.

11. The bush defined in claim 10 wherein said slit has an axis of symmetry and said recessed surfaces are symmetrically positioned relative to said axis of symmetry on opposite sides of said slit.

12. The bush defined in claim 11 wherein said recessed surfaces are substantially planar surfaces.

13. The bush defined in claim 11 wherein said recessed surfaces are curved surfaces.

14. In a bush and hub assembly for securing pulleys, sprockets, coupling flanges or other machine elements onto cylindrical shafts, the assembly including a hub, a taper bush received in the hub and having a central axis and three holes extending axially of the bush at angularly spaced locations about said axis, fasteners such as screws or bolts received in said holes generally parallel to said axis for wedging the bush between the hub and a shaft to be positioned axially within the bush, and wherein the bush has a longitudinal slit extending between two of the holes opposite the third hole in the bush, the improvement comprising an enlargement of the longitudinal slit wherein the enlargement is of predetermined size and distance from said axis to impart substantial rotational balance to the bush and the hub and the shaft to be associated therewith during use thereof.

* * * * *